(12) United States Patent
Shigeta et al.

(10) Patent No.: US 10,747,370 B2
(45) Date of Patent: Aug. 18, 2020

(54) INFORMATION PROCESSING DEVICE, INFORMATION PROCESSING METHOD, AND PROGRAM FOR OUTPUTTING A DISPLAY INFORMATION ITEM ABOUT AN OPERATION OBJECT

(71) Applicant: SONY CORPORATION, Tokyo (JP)

(72) Inventors: Osamu Shigeta, Chiba (JP); Kunihito Sawai, Kanagawa (JP); Masayuki Yamada, Tokyo (JP); Kentaro Ida, Tokyo (JP); Takuya Ikeda, Tokyo (JP); Yousuke Kawana, Tokyo (JP); Maki Imoto, Tokyo (JP); Akane Yano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 94 days.

(21) Appl. No.: 16/077,286

(22) PCT Filed: Dec. 20, 2016

(86) PCT No.: PCT/JP2016/087879
§ 371 (c)(1),
(2) Date: Aug. 10, 2018

(87) PCT Pub. No.: WO2017/141540
PCT Pub. Date: Aug. 24, 2017

(65) Prior Publication Data
US 2019/0050111 A1    Feb. 14, 2019

(30) Foreign Application Priority Data

Feb. 18, 2016   (JP) .................................. 2016-029082

(51) Int. Cl.
*G06F 3/042*    (2006.01)
*G06F 3/0488*    (2013.01)
(Continued)

(52) U.S. Cl.
CPC .......... *G06F 3/0425* (2013.01); *G06F 3/0484* (2013.01); *G06F 3/0488* (2013.01);
(Continued)

(58) Field of Classification Search
CPC .... G06F 3/0425; G06F 3/0488; G06F 3/0484; G06F 3/042; G06F 2203/04801;
(Continued)

(56) References Cited

U.S. PATENT DOCUMENTS 5,214,414 A * 5/1993 Levine ................. G09G 3/3611
345/157
6,727,892 B1 * 4/2004 Murphy .............. G06F 3/04842
178/18.01
(Continued)

FOREIGN PATENT DOCUMENTS

WO   WO-2007060604 A2 *  5/2007 .............. G06F 3/011

*Primary Examiner* — Rodney Amadiz
(74) *Attorney, Agent, or Firm* — Paratus Law Group, PLLC

(57) ABSTRACT

An information processing device includes an output control unit that outputs a display information item about an operation object on the basis of a result of detection of a pointing operation with respect to the operation object by a user. The output control unit outputs the display information item about the operation object such that the operation object is displayed in at least either one of a first display mode and a second display mode different from the first display mode in accordance with an operating condition of the pointing operation.

19 Claims, 15 Drawing Sheets

(51) Int. Cl.
*G06F 3/0484* (2013.01)
*G09G 5/08* (2006.01)
*G06F 3/0481* (2013.01)
*G09G 3/00* (2006.01)

(52) U.S. Cl.
CPC .............. *G09G 5/08* (2013.01); *G06F 3/042* (2013.01); *G06F 3/04812* (2013.01); *G06F 3/04842* (2013.01); *G06F 2203/04801* (2013.01); *G06F 2203/04804* (2013.01); *G09G 3/002* (2013.01); *G09G 2354/00* (2013.01)

(58) Field of Classification Search
CPC ............ G06F 3/04812; G06F 3/04842; G06F 2203/04804; G06F 3/0418; G06F 3/03547; G06F 3/04817; G09G 5/08; G09G 3/002; G09G 2354/00
See application file for complete search history.

(56) References Cited

U.S. PATENT DOCUMENTS

| | | | | |
|---|---|---|---|---|
| 7,605,804 B2* | 10/2009 | Wilson | .................. | G06F 3/0488 345/173 |
| 8,643,616 B1* | 2/2014 | Zhang | ................ | G06F 3/04842 345/173 |
| 9,367,160 B2* | 6/2016 | Hirai | .................... | G06F 3/0412 |
| 9,983,695 B2* | 5/2018 | Nicholson | ............. | G06F 3/0383 |
| 2009/0284532 A1* | 11/2009 | Kerr | ...................... | G06F 3/0481 345/442 |
| 2011/0083108 A1* | 4/2011 | Klein | ................... | G06F 3/0481 715/859 |
| 2012/0327104 A1* | 12/2012 | Schrauben | ......... | G06F 3/04812 345/619 |

* cited by examiner

| | Delay | Stability of position coordinates (variance from true value) |
|---|---|---|
| Raw value $I_r$ | Medium | Medium |
| Stabilization-filter application value $I_s$ | Large | Low |
| Predictive value $I_e$ | Small | High |

A

B

A

B

INFORMATION PROCESSING DEVICE, INFORMATION PROCESSING METHOD, AND PROGRAM FOR OUTPUTTING A DISPLAY INFORMATION ITEM ABOUT AN OPERATION OBJECT

CROSS REFERENCE TO PRIOR APPLICATION

This application is a National Stage Patent Application of PCT International Patent Application No. PCT/JP2016/087879 (filed on Dec. 20, 2016) under 35 U.S.C. § 371, which claims priority to Japanese Patent Application No. 2016-029082 (filed on Feb. 18, 2016), which are all hereby incorporated by reference in their entirety.

TECHNICAL FIELD

The present technology relates to an information processing device capable of performing display control in response to a pointing operation by a user. The present technology also relates to an information processing method and a program in the information processing device.

BACKGROUND ART

Today, various selection operations are utilized for performing interactions between humans and computers. For example, there may be mentioned an operation to a device (controller) held by a user, and a touch operation to a touchscreen. Further, gesture input, eye-tracking input, operations to next-generation pointing devices, and the like seem to prevail in the future.

In order to improve an operational feeling to the user in performing such a pointing operation, it is important that visual feedback in response to the operation be provided to the user, which causes new types of problems.

For example, there is a problem of a trade-off between stabilization of position coordinates and delays. Specifically, when input from the user is applied as it is to a selected operational position, the position coordinates are instable. As a countermeasure, a process of stabilizing the position coordinates (filtering process) is applicable. However, the delays occur in that case.

As described, for example, in Patent Literature 1 below, techniques for stabilizing the position coordinates with a small delay have been proposed. The information processing device described in Patent Literature 1 acquires coordinates of a touch position via touch sensors, a regression line representing relationship between "q" coordinates X(n+1) to X(n+q) that are acquired in an order of (n+1) to (n+q), calculates a coordinate X(n+q)' on the regression line, which is closest to the coordinate X(n+q), and corrects the coordinate X(n+q) by using the coordinate X(n+q)'. With this configuration, at a time point when the coordinate X(n+q) is acquired, the calculation of the coordinate X(n+q)' can be started. Thus, errors between detected positions and actual ones can be reduced in real time. As a result, a feeling of discomfort to the user is reduced without degrading responsivity.

CITATION LIST

Patent Literature

Patent Literature 1: Japanese Patent Application Laid-open No. 2012-194841

DISCLOSURE OF INVENTION

Technical Problem

However, in the technology described in Patent Literature 1, even when stable input to position coordinates is performed, there is influence of delays in an entirety of a system, which are caused, for example, by displaying on a screen. Thus, the delays still occurs. In order to solve this problem, there has also been a technology for predicting future position coordinates on the basis of an input history from past to present. However, this technology has a problem that stability of the position coordinates is lost.

Further, although the delays may not be a significant problem in cases where an operational range is relatively small as in a case of a touchscreen operation to a smartphone, when the selection operations are performed with respect to a large screen, a moving ranges extensive. Thus, the problem of the delays is noticeable. Further, a filtering processing load to be applied to instable input coordinates such as those in performing the gesture input and the eye-tracking input is relatively high. Thus, the delays are problematic.

In view of such circumstances, the present technology has been made to achieve an object to provide an information processing device capable of improving, by elaborating representations of visual feedback, an operational feeling to a user in performing a pointing operation, and to provide an information processing method and a program.

Solution to Problem

According to an embodiment of the present technology, there is provided an information processing device including an output control unit, that outputs a display information item about an operation object on a basis of a result of detection of a pointing operation with respect to the operation object by a user.

The output control unit outputs the display information item about the operation object such that the operation object is displayed in at least either one of a first display mode and a second display mode different from the first display mode in accordance with an operating condition of the pointing operation.

With this configuration, the information processing device is enabled to display the operation object in the different display modes in accordance with the operating condition of the pointing operation by the user. In this way, an operational feeling at a time of the pointing operation can be improved.

The output control unit may use, as the first display mode, a display mode that gives a priority to delay reduction with respect to the pointing operation, and use, as the second display mode, a display mode that gives a priority to stability of the result of the detection.

With this, the information processing device is enabled to change the display modes in accordance with the operating condition of the pointing operation. In this way, both the delay reduction with respect to the pointing operation and the stability of the result of the detection can be achieved.

The output control unit may switch the display information item about the operation object between the first display mode and the second display mode in accordance with the operating condition of the pointing operation.

With this, the information processing device is enabled to dynamically switch the display modes for the display information item about the operation object in accordance with the operating condition. In this way, the user is enabled to easily grasp a pointing position.

The output control unit may make, in accordance with the operating condition of the pointing operation, a switch between a process of outputting the display information item about the operation object in both the first display mode and the second display mode, and a process of outputting the display information item about the operation object in either one of the first display mode and the second display mode.

With this, the information processing device is enabled to display both or only one of the different display modes for the display information item about the operation object in accordance with the operating condition. In this way, the user is enabled to easily grasp the pointing position.

The operating condition of the pointing operation may include any of a user information item about the user, a device information item about the information processing device, an environment information item about an environment where the information processing device is installed, and a content information item about a target of the pointing operation.

The result of the detection may include an information item about input coordinate values of the pointing operation, and the operation object may be displayed at a position corresponding to the input coordinate values.

In this case, the output control unit may render, as the first display mode, the display information item about the operation object on a basis of predictive values calculated from the detected input coordinate values, and render, as the second display mode, the display information item about the operation object on a basis of coordinate values generated by applying a predetermined stabilization filter to the detected input coordinate values.

With this, the information processing device is enabled to achieve the delay reduction by using the predictive values, and, at the same time, to achieve stability of the input coordinate values by using the stabilization filter.

The output control unit may render, as the first display mode, the display information item about the operation object by using the predictive values and values arranged at random around the predictive values at the same time, and render, as the second display mode, the display information item about the operation object while emphasizing the coordinate values generated by applying the stabilization filter.

With this, the information processing device is enabled to hinder the user from perceiving instability of the position corresponding to the input coordinate values by using the first display mode, and enabled to clearly bring the pointing position close to the user by using the second display mode.

The user information item may include a speed information item about a speed of the pointing operation.

In this case, the output control unit may use the first display mode in a case where a value indicating the speed of the pointing operation included in the speed information item is equal to or larger than a predetermined threshold, and use the second display mode in a case where the value indicating the speed is less than the predetermined threshold.

With this, the information processing device is enabled to achieve the delay reduction by using the first display mode when the speed of the pointing operation is high, and to achieve the stability of the input coordinate values by using the second display mode when the speed of the pointing operation is low (also when the pointing operation is stopped).

The output control unit may use the first display mode in a case where the target of the pointing operation is a first object, and use the second display mode in a case where the target of the pointing operation is a second object different from the first object.

With this, the information processing device is enabled to change the display modes depending on whether the target of the pointing operation is an object to which the delay reduction is important (such as object that is capable of moving relatively extensively), or an object to which the stability of the input coordinate values is important (such as object that is relatively small and needs a careful pointing operation).

The user information item may include an operation-type information item about a type of the pointing operation.

In this case, the output control unit may use the first display mode in a case where the pointing operation is an operation of moving an object, and use the second display mode in a case where the pointing operation is not the operation of moving an object.

With this, the information processing device is enabled to use the first display mode in performing a moving operation that requires the delay reduction, and to use the second display mode in performing other operations that require the stability of the input coordinate values rather than the delay reduction.

The device information item may include an information item about a condition of a CPU or battery of the information processing device.

In this case, the output control unit may use the first display mode in a case where the CPU or battery is in a first condition, and use the second display mode in a case where the CPU or battery is in a second condition different from the first condition.

With this, the information processing device is enabled to use, for example, when a processing load on the CPU is low, or when a remaining capacity of the battery is sufficient, the first display mode in which a processing load is relatively high (power consumption is high). The information processing device is enabled to use, when the processing load on the CPU is high, or when the remaining capacity of the battery is low, the second display mode in which the processing load is low (power consumption is low).

The output control unit may calculate interpolated values for predictive values at a first time on a basis of the predictive values at the first time and interpolated values for predictive values at a second time preceding the first time, and render the display information item about the operation object at the first time on a basis of the calculated interpolated values.

With this, the information processing device is enabled to cause, by using the interpolated values, the first display mode using the predictive values to be a display mode that is increased in stability and followability.

The output control means may render, as the first display mode, the display information item about the operation object in a form of particles or dots, and render, as the second display mode, the display information item about the operation object in a form of a cursor or focus.

With this, in the first display mode, the information processing device is enabled to cause, by using the particle representation or the dot representation, instability of the coordinate values to be unnoticeable while achieving the delay reduction. In the second display mode, the information processing device is enabled to cause, by using the cursor representation or the focus representation, the display information item to be noticeable at a position corresponding to stable coordinate values.

The pointing operation may be an operation with a finger of the user.

In this case, the output control means may render, as the first display mode, the display information item about the operation object in a manner that the display information item about the operation object extends from the object as the target of the pointing operation toward the finger of the user while gradually narrowing and increasing in transparency, and render, as the second display mode, the display information item about the operation object in a manner that the extended form contracts and converges on the object as the target of the pointing operation.

With this, the information processing device is enabled to display, for example, when the operation object is moved, an animation in which a pointer like expandable rubber, or a pointer like cords or strands expands from the object being the operation target toward the finger of the user. In this way, the delay reduction can be achieved. The information processing device is enabled to display, for example, when the operation object is stopped, an animation in which the pointer like expandable rubber, or the pointer like cords or strands contracts, converges, and is stabilized. In this way, the stability of the coordinate values can be achieved.

According to another embodiment of the present technology, there is provided an information processing method including:

acquiring a result of detection of a pointing operation with respect to an operation object by a user; and outputting, on a basis of the result of the detection, a display information item about the operation object such that the operation object is displayed in at least either one of a first display mode and a second display mode different from the first display mode in accordance with an operating condition of the pointing operation.

According to still another embodiment of the present technology, there is provided a program that causes an information processing device to perform the steps of:

acquiring a result of detection of a pointing operation with respect to an operation object by a user; and outputting, on a basis of the result of the detection, a display information item about the operation object such that the operation object is displayed in at least either one of a first display mode and a second display mode different from the first display mode in accordance with an operating condition of the pointing operation.

Advantageous Effects of Invention

As described above, according to the present technology, the operational feeling to the user in performing the pointing operation can be improved by elaborating the representations of the visual feedback. However, this advantage does not the present technology.

MODE(S) FOR CARRYING OUT THE INVENTION

Now, an embodiment of a case where the present technology is applied to a tabletop system is described with reference to the drawings.

[Configuration of System]

Figure 1:
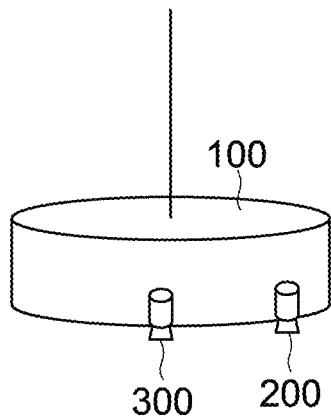
FIG. 1 A view illustrating a configuration of a tabletop system according to an embodiment of the present technology.
Figure 1:
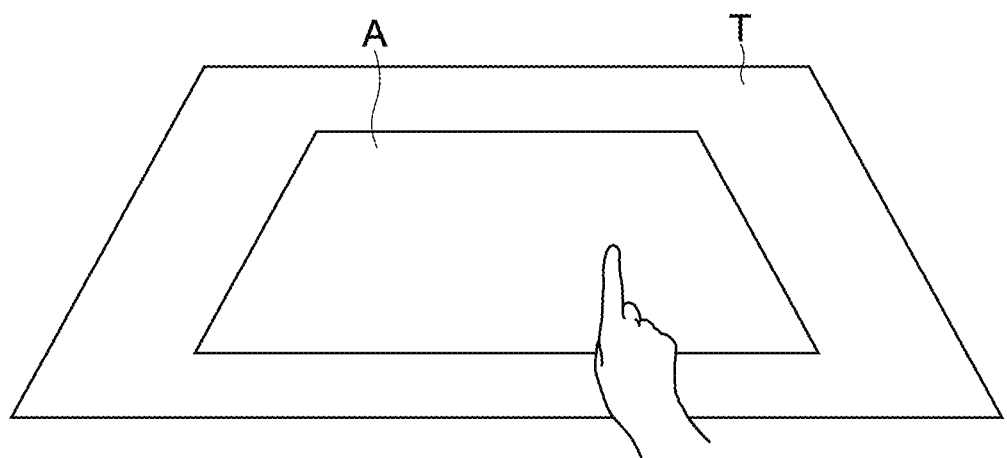

FIG. 1 is a view illustrating a configuration of a tabletop system according to the embodiment.

As illustrated in FIG. 1, this system includes an output control device 100, a camera 200, and a projector 300. These may be installed, for example, in a ceiling in a room, or may be configured integrally with an illumination device suspended from the ceiling.

In this system, a table T functions as a screen. The projector 300 projects a graphical user interface including icons and contents onto a projection region A on the table T, and a user operates the projected interface with his/her finger.

The camera 200 acquires an image of the projection region A, and this image is input to the output control device 100. The output control device 100 detects positions of a fingertip of the user in the image input from the camera 200, and executes output control processes such as a selection process and a process of moving a pointer on the basis of the detected coordinate values.

[Hardware Configuration of Output Control Device]

Figure 2:
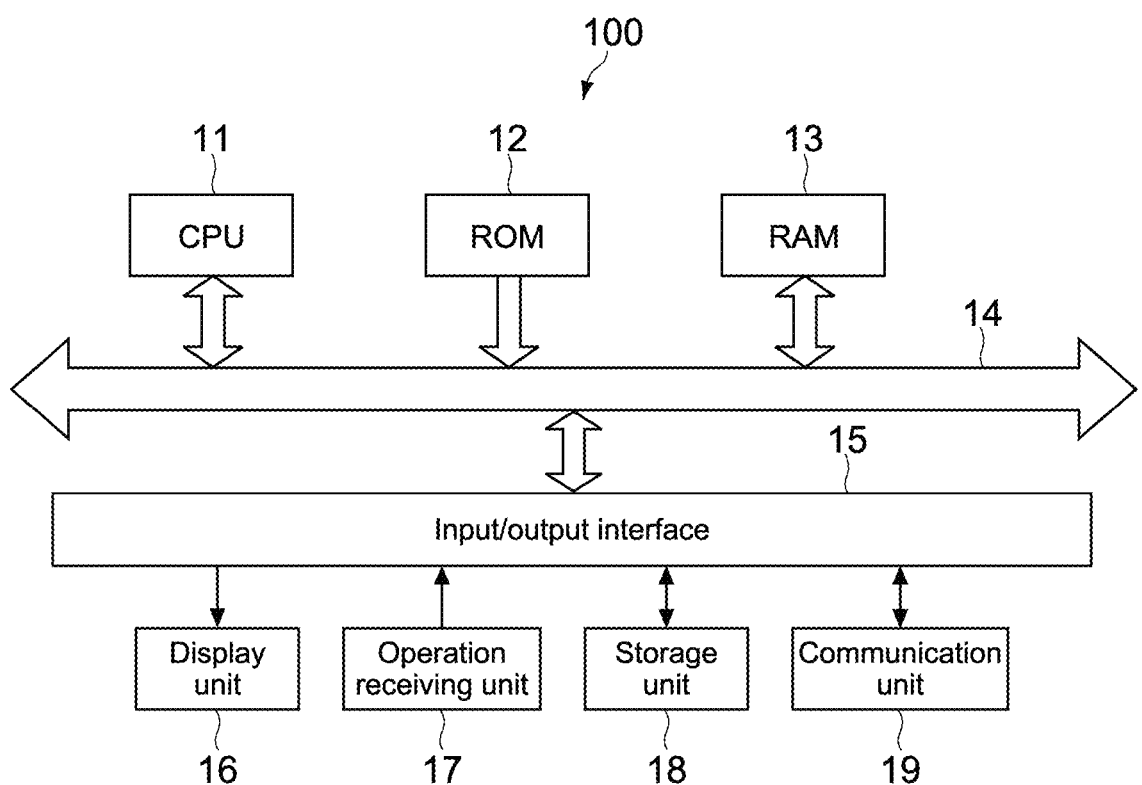
FIG. 2 A diagram showing a hardware configuration of an output control device in the tabletop system.

FIG. 2 is a diagram showing a hardware configuration of the output control device 100. As shown in FIG. 2, the output control device 100 includes a CPU (Central Processing Unit) 11, a ROM (Read Only Memory) 12, a RAM (Random Access Memory) 13, an input/output interface 15, and a bus 14 that connects these to each other.

The CPU 11 accesses, for example, the RAM 13 when necessary, and collectively controls all blocks in the output control device 100 while executing various calculation processes. The ROM 12 is a nonvolatile memory that permanently stores firmware to be executed by the CPU 11, such as an OS, programs, and various parameters. The RAM 13 used, for example, as a work area for the CPU 11, and temporarily holds the OS, various applications being executed, and various data items being processed.

A display unit 16, an operation receiving unit 17, a storage unit 18, a communication unit 19, and the like are connected to the input/output interface 15.

The display unit 16 is a display device using, for example, an LCD (Liquid Crystal Display), an OELD (Organic ElectroLuminescence Display), or a CRT (Cathode Ray Tube).

The operation receiving unit 17 is an input device including keys and switches, receives the operation to the output control device by the user, and transmits, to the CPU 11, information items of the operation.

The storage unit 18 is, for example, an HDD (Hard Disk Drive), or nonvolatile memories such as a flash memory (SSD; Solid State Drive) and other solid-state memories. The storage unit 18 stores not only the OS, the various applications, and the various data items, but also software programs and data items necessary for the output control processes on, for example, the pointer in this embodiment.

The communication unit 19 includes various wireless-communication modules such as an Ethernet NIC (Network Interface Card) and a wireless LAN, and executes communication processes with respect to peripheral devices such as the camera 200 and the projector 300.

[Functions of System and Fingertip Positions to Be Processed]

Figure 3:
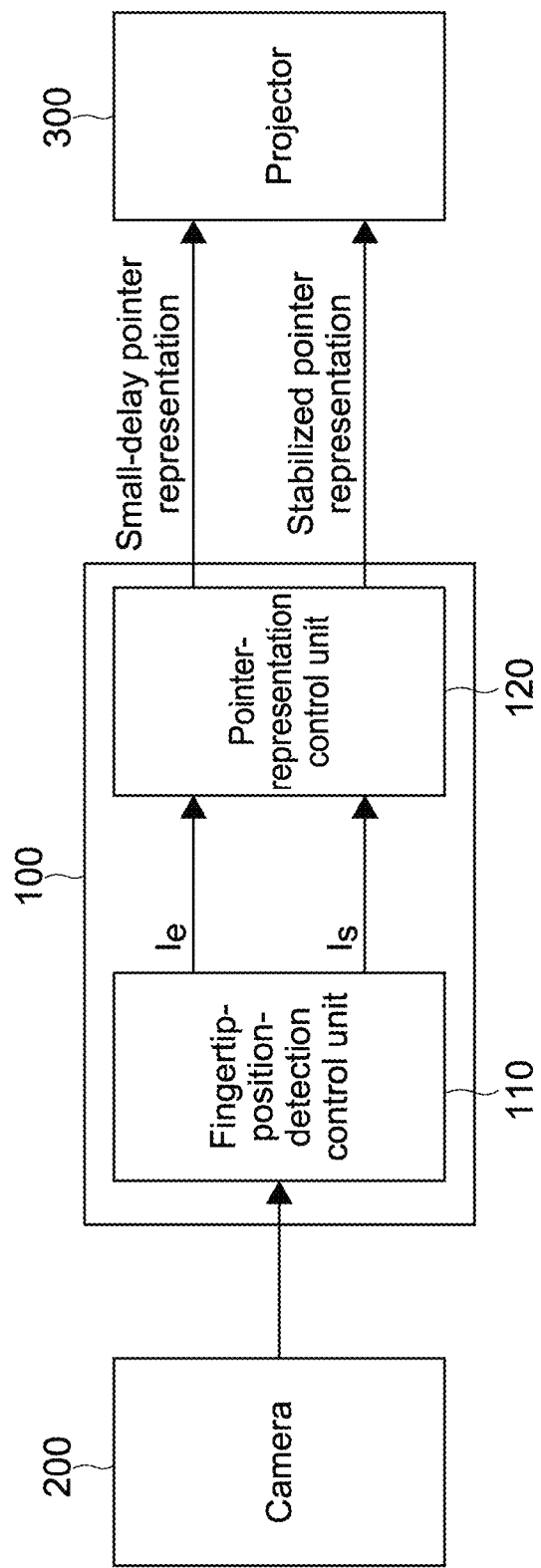
FIG. 3 A function block diagram of the tabletop system.

FIG. 3 is a function block diagram of the tabletop system. Further, FIG. 4 includes an explanatory table and an explanatory view showing the fingertip positions to be processed in this system.

As shown in FIG. 3, the output control device 100 includes a fingertip-position-detection control unit 110 and a pointer-representation control unit 120.

The fingertip-position-detection control unit 110 detects, in the image input from the camera 200, the positions of the fingertip of the user who performs a pointing operation with his/her finger.

The pointer-representation control unit 120 represents, in at least any of a plurality of display patterns on the basis of the detected positions of the fingertip, the pointer that indicates the pointing positions, and output a display information item thereof to the projector 300.

Figure 4:
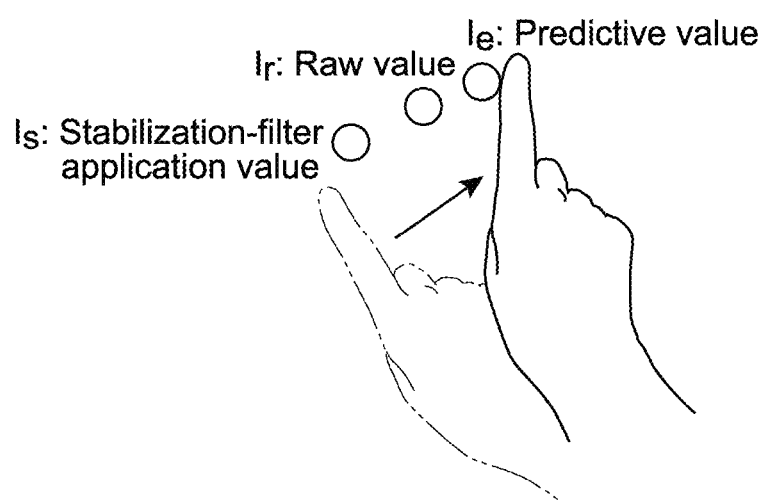
FIG. 4 An explanatory table and an explanatory view showing fingertip positions to be processed in the tabletop system.

As shown in FIG. 4, there are three types of the fingertip positions to be processed in this embodiment. A fingertip position detected by the fingertip-position-detection control unit 110 is referred to as I_r (raw value), a fingertip position to which a stabilization filtering process is applied is referred to as I_s (stabilization-filter application value), and a fingertip position predicted in consideration of delays in an entirety of the system, which are caused, for example, by the image acquisition via the camera 200, the control processes by the output control device, and the display process by the projector 300, is referred to as I_e (predictive value).

A of FIG. 4 is a table showing relationships between the delays and stability of position coordinates (variance from a true value), which relate to the I_r (raw value), the I_s (stabilization-filter application value), and the I_e (predictive value). B of FIG. 4 is a view illustrating positional relationships between the I_r (raw value), the I_s (stabilization-filter application value), and the I_e (predictive value) on the table T.

As shown A of FIG. 4, the predictive value has characteristics of being smaller in delay but lower in stability than the raw value, and the stabilization-filter application value has characteristics of being larger in delay but higher in stability than the raw value. Thus, as illustrated in B of FIG. 4, when the user moves his/her fingertip in a direction of an arrow in B of FIG. 4, the stabilization filter value represents a position preceding the raw value by a distance corresponding to the delay, and the predictive value represents a position subsequent to the raw value by a distance corresponding to its prediction.

In other words, there arises a problem of a trade-off that the delay occurs when the stabilization filter value obtained by applying the stabilization filtering process for stabilizing the position coordinates is applied in consideration of a risk that the stability of the position coordinates is lost when the raw value is applied as it is to a position of the pointing operation (such as selection operation) by the user, and meanwhile, the stability of the position coordinates is lost when the predictive value is applied to minimize the delay.

In this embodiment, is order to solve the problem of the trade-off between the delay and the stabilization, two types of representation techniques are applied.

Specifically, as shown in FIG. 3, the pointer-representation control unit 120 of the output control device 100 uses a representation that is enabled to represent fluctuation (instability) of the position coordinates (small-delay pointer representation) with respect to coordinate values that are small is delay but low in stability, such as the predictive value. Further, the pointer-representation control unit 120 applies, with respect to coordinate values to which coordinates that cause the delay but are stable are applicable, such as the stabilization filter value, a representation that clearly represents (highlights) these stable coordinates (stabilized pointer representation).

In other words, as shown in FIG. 3, the fingertip-position-detection control unit 110 generates either one of the I_e (predictive value) and the I_s (stabilization-filter application value) on the basis of the I_r (raw value) detected by the fingertip-position-detection control unit 110, and outputs the either one of the I_e and the I_s to the pointer-representation control unit 120. Then, the pointer-representation control unit 120 causes the projector 300 to display at least one of the I_e (predictive value) and the I_s (stabilization-filter application value) in accordance with an operating condition of the pointing operation by the user.

Figure 5:
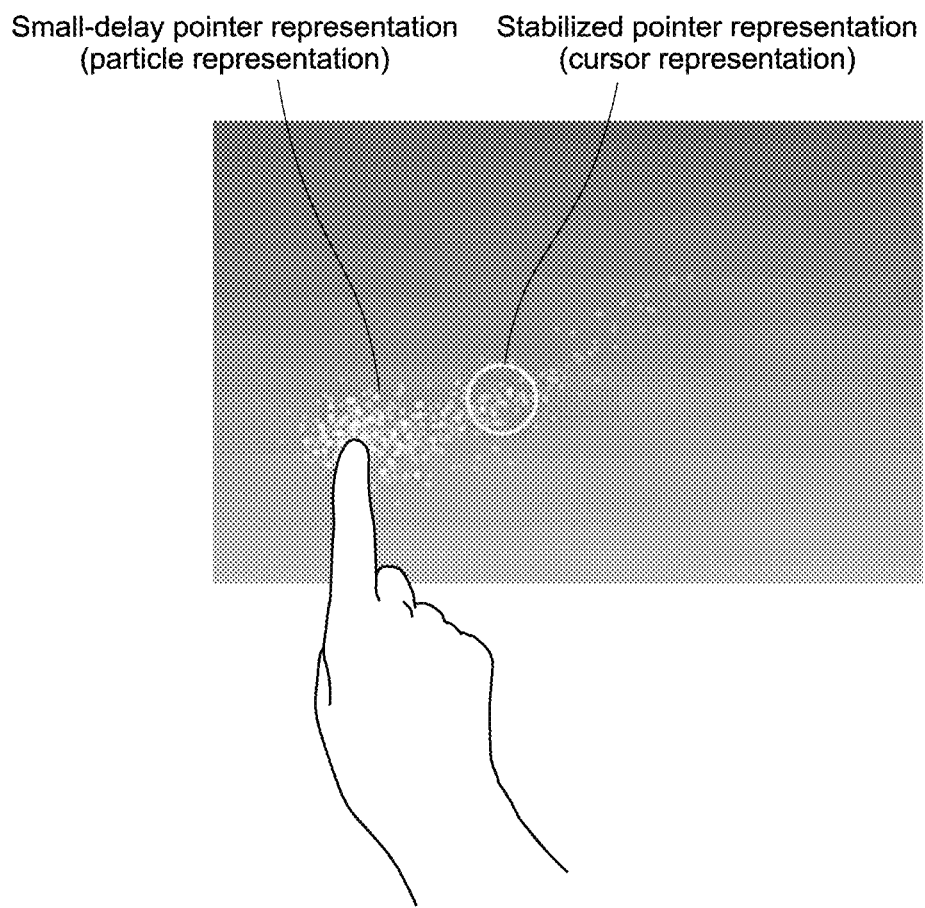
FIG. 5 A view illustrating a display example of a pointer to be used in the tabletop system.

FIG. 5 is a view illustrating a display example of the small-delay pointer representation and the stabilized pointer representation. As illustrated in FIG. 5, in this embodiment, a particle representation is used as the small-delay pointer representation, and a cursor representation is used as the stabilized pointer representation.

By application of such two types of representation techniques, this system is enabled to provide visual feedback of small-delay position coordinates to the user, with the instability of these coordinates being caused to be unnoticeable with the particle representation, and enabled to provide visual feedback of a definite operational position with the cursor representation to the user at times of performing operations such as selection and determination, in which the stability of the coordinates is important.

[Operation of System]

Next, an operation of the tabletop system configured as described above is described. This operation is performed cooperatively by the hardware such as the CPU 11 of the output control device 100 and the software (programs) stored in the storage unit 18, which functions as the fingertip-position-detection control unit 110 and the pointer control unit 120.

In the above-described two types of representation techniques, when, for example, the user performs an operation of moving his/her finger relatively quickly on a large screen to cause a distance difference between a stabilized pointer and a small-delay pointer (hereinafter, referred to as "delay-derived distance difference"), there arises a problem that with which of these pointers the user performs the operation cannot be recognized (problem of a master-servant relationship).

In a case where this problem noticeably occurs, the pointer-representation control unit 120 may selectively control the pointer representations. For example, when a speed of the moving operation by the user (moving distance per unit time) is equal to or higher than a threshold, the pointer-representation control unit 120 may cancel the stabilized pointer representation, or may cause the stabilized pointer representation to be unnoticeable, for example, by adding a transmission representation.

Further, when the speed of the position coordinates decreases lower than the threshold as in a case where the user selects a target, the pointer-representation control unit 120 may display the stabilized pointer representation again.

Still further, when the user pauses to select the target, although the stabilization filter value remains unchanged, the predictive value may fluctuate in response to a slight movement. In such a case, after the fingertip-position-detection control unit 110 detects the pause state, the pointer-representation control unit 120 may display the stabilized pointer, and cancel or cause the small-delay pointer representation to be transmissive.

Figure 6:
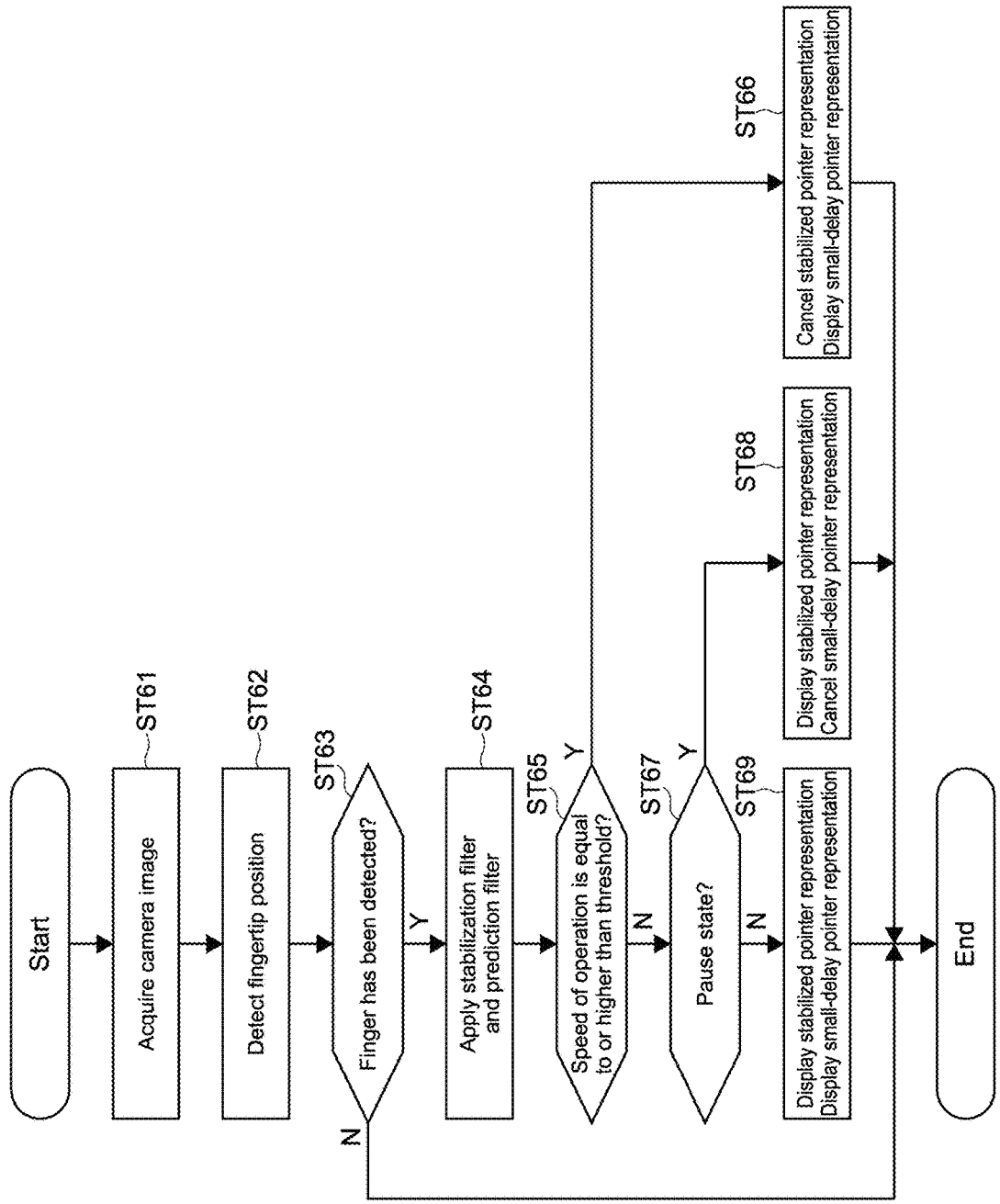
FIG. 6 A flowchart showing a procedure of output control processes on the pointer by the output control device in the tabletop system.

FIG. 6 is a flowchart showing a procedure of processes by the output control device 100, to which the above-described control processes are added. For the sake of convenience, in the description with reference to FIG. 6, the CPU 11 itself of the output control device 100 executes the processes.

As shown in FIG. 6, the CPU 11 of the output control device 100 acquires the image via the camera 200 (Step 61).

Then, the CPU 11 causes the fingertip-position-detection control unit 110 to detect a fingertip of the user in the acquired image (Step 62).

Next, the CPU 11 determines whether or not the finger of the user has been detected in the image (Step 63).

When the CPU 11 determines that the finger of the user has been detected in the image (Yes), the CPU 11 causes the fingertip-position-detection control unit 110 to apply a stabilization filter and a prediction filter to the raw value of the detected fingertip so as to respectively generate the stabilization-filter application value and the predictive value (Step 64).

Now, specific examples of processes of applying the stabilization filter and the prediction filter are described.

As the stabilization filter, for example, a primary IIR (Infinite Impulse Response) filter as expressed by the following equations is applied to input coordinates P(x,y).

$$X'_t = \alpha X_t + (1-\alpha) X'_{t-1}$$

$$Y'_t = \alpha Y_t + (1-\alpha) Y'_{t-1}$$

In these equations, X' and Y' are coordinates after the application of the stabilization filter, and X and Y correspond to the raw value. The CPU 11 applies a weight $\alpha$ to values of $X_t$ and $Y_t$ with respect to $X'_{t-1}$ and $Y'_{t-1}$ at a preceding timing so as to update coordinate values of the stabilization filter. In this way, the CPU 11 generates smooth coordinates.

A technique of the stabilization filter is not limited to the IIR (Infinite impulse Response) filter, and there may be applied various techniques such as a Kalman filter, a particle filter, a FIR (Finite Impulse Response) filter, and machine learning techniques.

As the prediction filter, for example, a uniform linear motion as expressed by the following equations is applied to the input coordinates P(x,y).

$$X'_{t+1} = X_t + (X_t - X_{t-1})$$

$$Y'_{t+1} = Y_t + (Y_t - Y_{t-1})$$

In these equations, $X'_{t+1}$ and $Y'_{t+1}$ correspond to the predictive value. The CPU 11 predicts a position at a subsequent timing by adding a previous positional difference (speed×minute period) to obtained current coordinates.

Actually, position coordinates are predicted by machine learning. The CPU 11 learns movements in previous minute times, searches for one of previous paths, which is closest to a path in a currently-obtained certain zone, and utilizes this path as the predictive value. In other words, the CPU 11 searches a large amount of previous path data for a path that is closest to a current movement, and utilizes this path as a future path. As techniques for calculating the predictive value, there may be used techniques other than the above-mentioned ones.

Referring back to FIG. 6, when the CPU 11 determines that the speed of the operation by the user is equal to or higher than a threshold (Yes), the CPU 11 causes the pointer-representation control unit 120 to cancel the stabilized pointer representation of the pointer that indicates the pointing operation by the user (or to execute the transmission process thereon), and causes the projector 300 to display the small-delay pointer representation (Step 66).

Meanwhile, when the CPU 11 determines that the speed of the operation by the user is lower than the threshold (No in Step 65), the CPU 11 determines whether or not the fingertip of the user is in the pause state (Step 67).

When the CPU 11 determines that the fingertip of the user is in the pause state (Yes), the CPU 11 causes the pointer-representation control unit 120 to display the stabilized pointer representation of the pointer, and causes the projector 300 to cancel the small-delay pointer representation (Step 68).

Meanwhile, when the CPU 11 determines that the fingertip of the user is not in the pause state (No in Step 67), the CPU 11 causes the projector 300 to display both the stabilized pointer representation and the small-delay pointer representation of the pointer.

Figure 7:
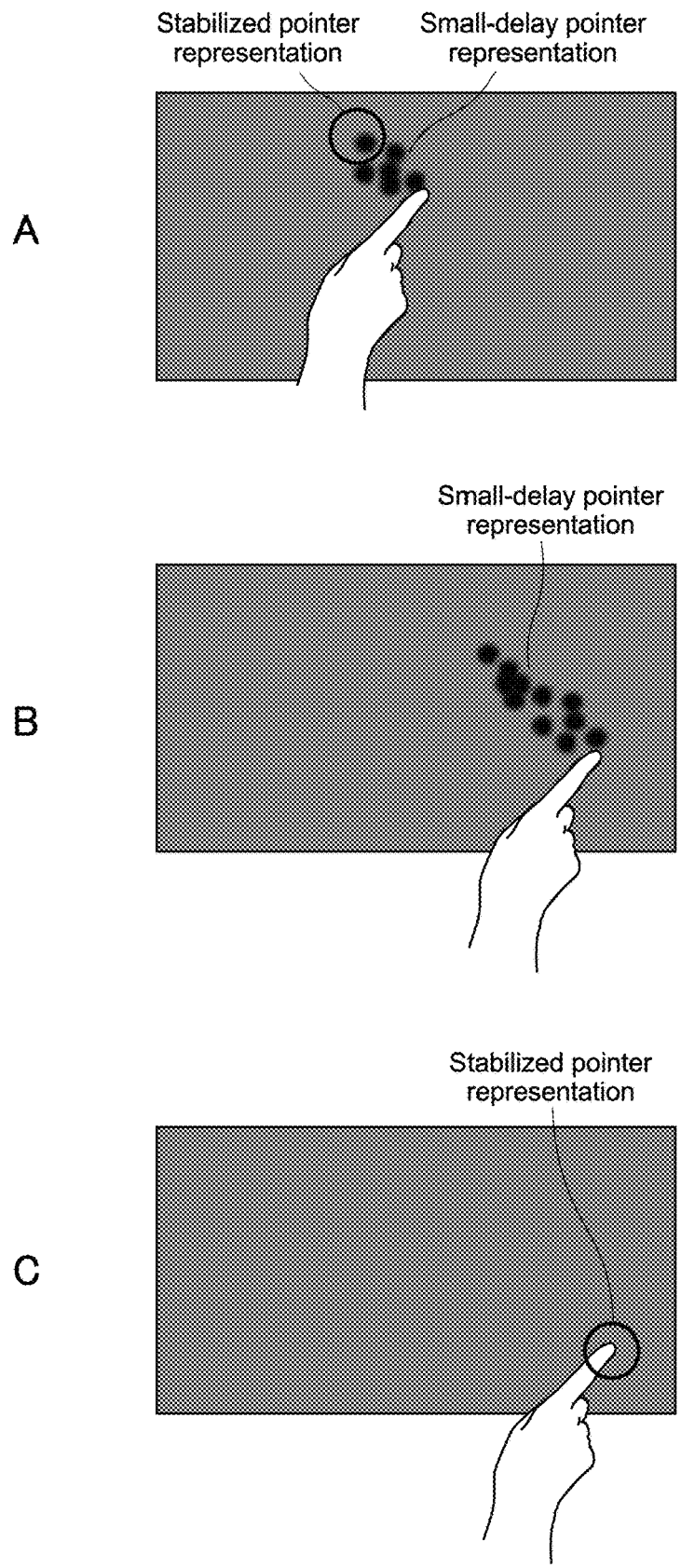
FIG. 7 Views illustrating examples of the pointer displayed in different display modes by the output control device.

FIG. 7 includes views illustrating display examples of the above-described pointer representations.

As illustrated in A of FIG. 7, when the speed of the operation by the user is not equal to or higher than the threshold, and, at the same time, when the fingertip of the user is not in the pause state, both the particle representation as the small-delay pointer representation and the cursor as the stabilized pointer representation are displayed.

Further, as illustrated in B of FIG. 7, when the speed of the operation by the user is equal to or higher than the threshold, the particle representation as the small-delay pointer representation is displayed, and the cursor as the stabilized pointer representation is displayed.

Still further, as illustrated in C of FIG. 7, when the fingertip of the user is in the pause state, the particle representation as the small-delay pointer representation is cancelled, and the cursor as the stabilized pointer representation is displayed.

Specifically, in these cases, the particle representation is displayed as follows.

Particles each have parameters of a position x, y, a speed vx, vy, and a transparency. Initial positions of the particles are set by adding random values to a vicinity of coordinates obtained from a group of predictive values. Further, values of initial speeds of the particles are set at random.

Then, the CPU 11 updates the particles by executing the following processes on the parameters.

Speed: As expressed by the following equation, a frictional force ($Frc_x$) is added to the initial speeds so that the speeds are reduced in accordance with a lapse of time.

$$\dot{X}_t = \dot{X}_{t-1} + Frc_x$$

Position: As expressed by the following equation, the positions are updated by adding the updated speeds. With this, the moving speeds of the particles gradually decrease as the particles separate from the fingertip of the user.

$$X_t = X_{t-1} + \dot{X}_t$$

Transparency: Transmittance is increased in accordance with the lapse of time. With this, the particles gradually disappear as the particles separate from the fingertip of the user.

As described above, according to this embodiment, the output control device 100 switches and displays, in accordance with the operating condition (operating speed), the stabilized pointer representation and the small-delay pointer representation as the pointer representation representing the pointing operation by the user. With this, the problem of the trade-off between the instability of the coordinates and the delays can be addressed.

[Modifications]

The present invention is not limited only to the above-described embodiment, and may be changed as appropriate without departing from the gist of the present disclosure.

(Modifications of Operating Technique)

In the above-described embodiment, the processes of applying the different pointer representations are executed in the tabletop system, specifically, executed on the touch operation with respect to a tabletop on which projection is performed. However, the same processes are applicable to other operations. For example, the input by the touch operation may be replaced, for example, with input by eye-tracking or pointing gestures, input by operations to a pointing remote controller and to analog joysticks such as a game controller, or input by an operation to a touchpad. Thus, instead of the camera 200 that is mentioned as an example in the above-described embodiment, there may be used other input units such as the analog joystick, the touchpad, a touchscreen, and an eye-gaze detection device. Further, instead of the projector 300 that performs projection onto the table, there may be used other display units such as another projector that performs projection onto a wall, a display, a smartphone, a tablet, and a head mounted display.

(Modification of Type of Coordinates to be Used in Processes)

Figure 8:
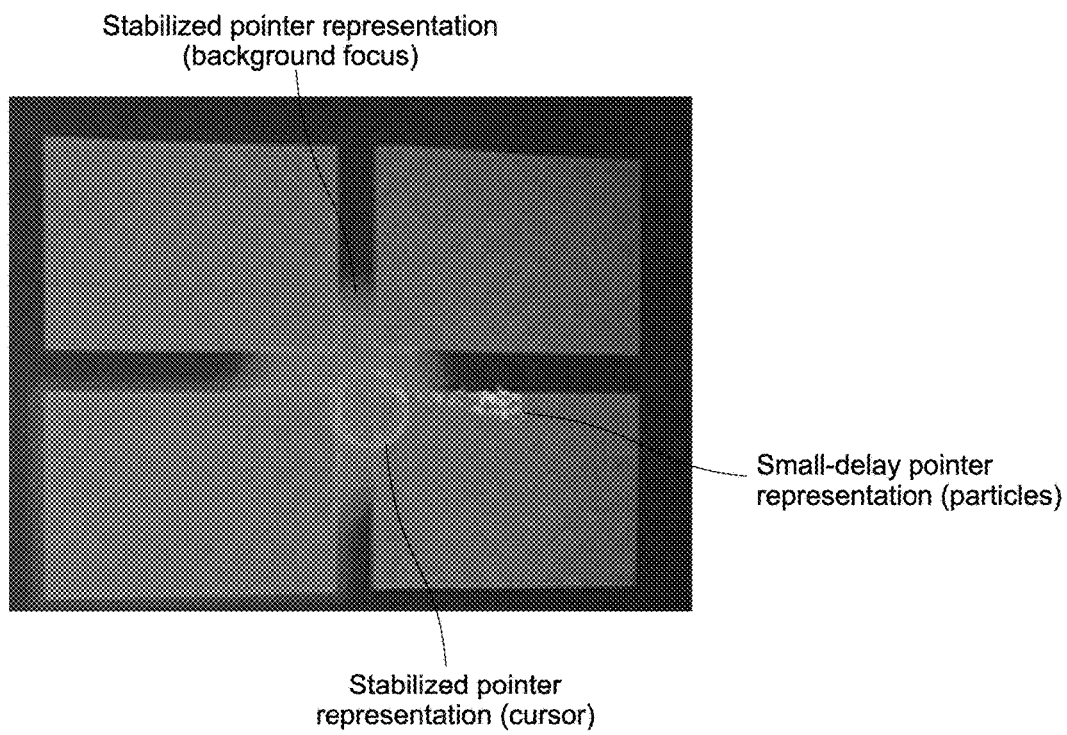
FIG. 8 A view illustrating a modification of the examples of the pointer displayed by the output control device.

In the above-described embodiment, the two types of representation techniques with respect to the two types of coordinates are used. However, the types of coordinates are not limited thereto, and there may be made an expansion to "m" types of representation techniques with respect to "n" types of coordinates. For example, as illustrated in FIG. 8, as the above-described stabilized pointer representation, a background focus representation may be displayed in addition to the cursor.

(Modifications of Processes on Raw Value)

In the above-described embodiment, the predictive value and the stabilization-filter application value are used in the control by the representation techniques. However, values other than these values may be used. Further, the, above-described embodiment is applicable to input values that do not have the characteristics of varying in delay and stability.

(Modifications of Pointer Representation Technique)

In the above-described embodiment, the particles are used as the small-delay pointer representation, and the cursor is used as the stabilized pointer representation. However, other representation techniques may be used. For example, instead of the particles as the small-delay pointer representation, a dot pattern may be used as illustrated in A of FIG. 9, or a contour representation may be used as illustrated in B of FIG. 9. Further, instead of the cursor as the stabilized pointer representation, a representation like a focus may be used as illustrated in B of FIG. 9.

Figure 9:
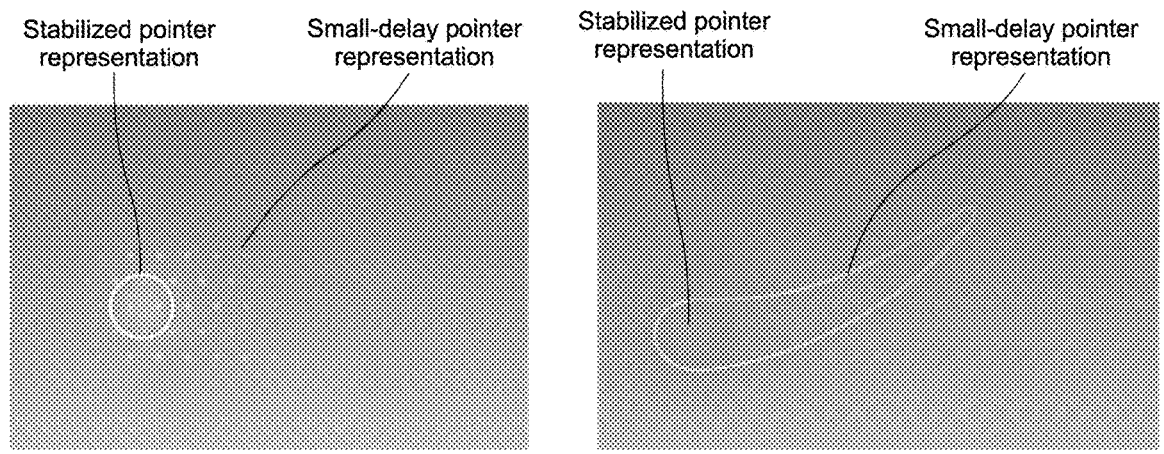
FIG. 9 Views illustrating other modifications of the examples of the pointer displayed by the output control device.

Note that, with regard to the dot pattern illustrated in A of FIG. 9, a mask image (image that expands like rubber) is generated from the group of predictive values, and the mask image is superimposed on a background image indicated by an array of dots. With this, a representation in which the dot pattern is displayed only in a mask region is displayed.

Figure 10:
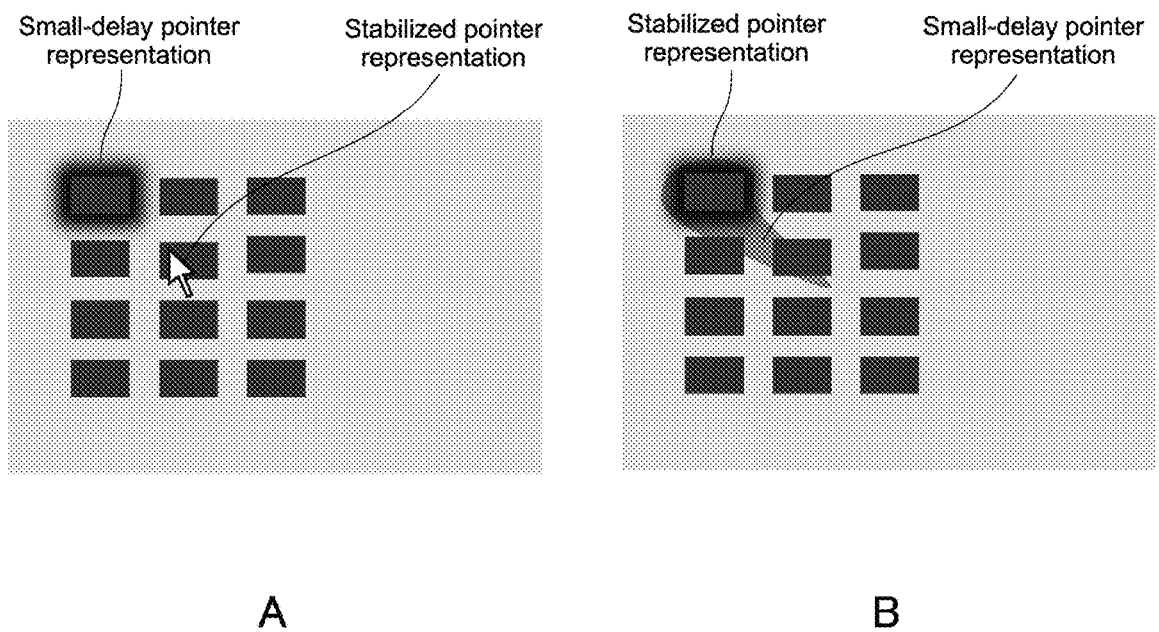
FIG. 10 Views illustrating still other modifications of the examples of the pointer displayed by the output control device.

Further, as illustrated in A of FIG. 10, an arrow-shaped cursor (mouse cursor) may be used as the stabilized pointer representation, and a circular blurred representation may be used as the small-delay pointer representation.

Still further, in a UI in which a definite cursor such as the pointer is not used, as illustrated in B of FIG. 10, a technique of a representation that expands like rubber may be used as the small-delay pointer representation and the focus representation followed thereby.

(Displaying Small-Delay Pointer Representation and Stabilized Pointer Representation Together)

In the above-described embodiment, the small-delay pointer representation and the stabilized pointer representation are displayed as independent pointer representations. However, as long as the above-described problem of the master-servant relationship (problem that which of the pointers is an operation target cannot be recognized) is prevented, there may be used a combination of the small-delay pointer representation and the stabilized pointer representation.

Figure 11:
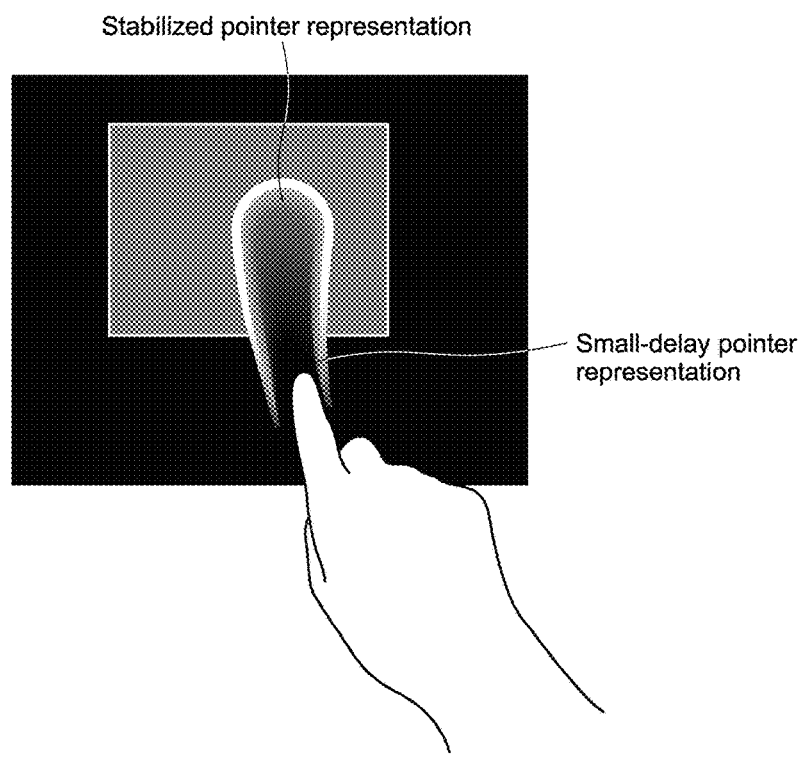
FIG. 11 A view illustrating yet another modification of the examples of the pointer displayed by the output control device.
Figure 12:
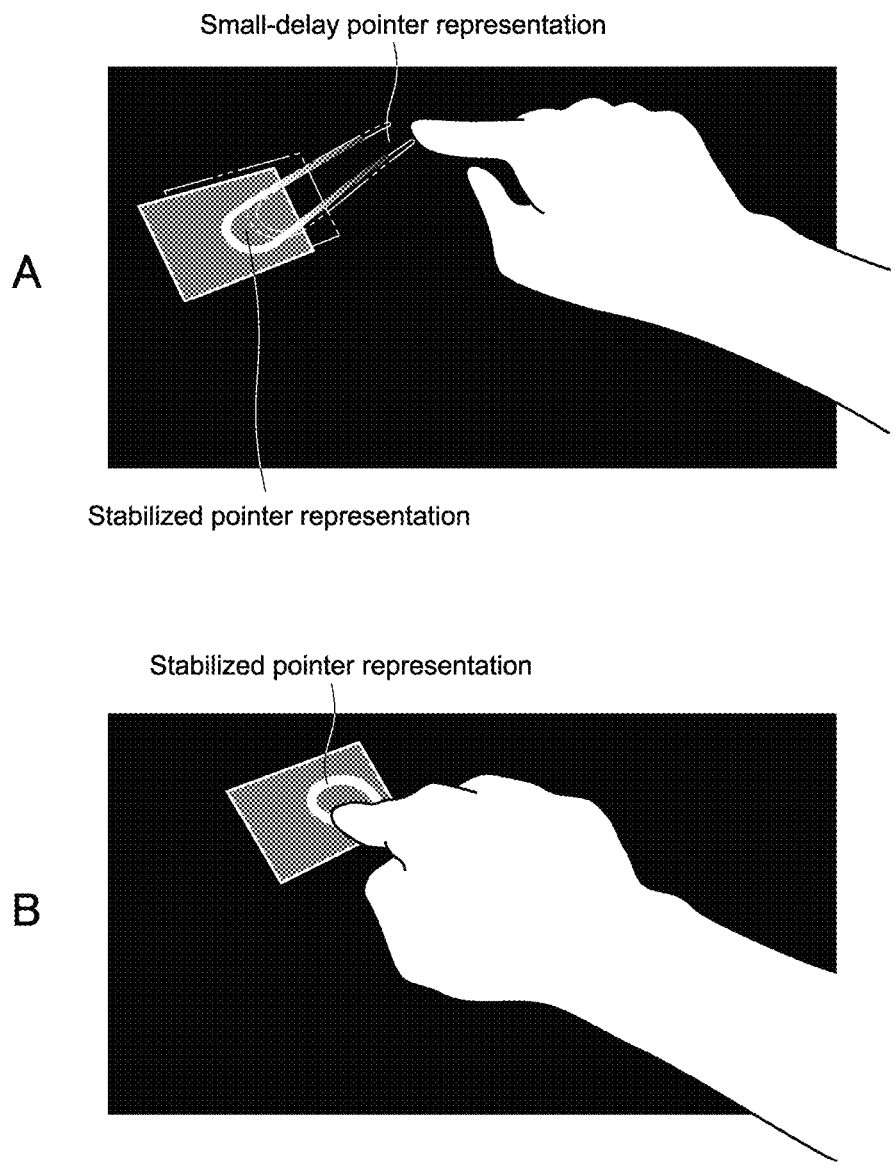
FIG. 12 Views illustrating the yet other modification of the examples of the pointer displayed by the output control device.

Specifically, as illustrated in FIG. 11 and FIG. 12, the output control device 100 uses a cursor representation that expands like rubber from an object being an operation target. In this way, only with a single representation technique of this rubber-like representation, the output control device 100 displays the small-delay pointer representation and the stabilized pointer representation.

More specifically, as illustrated in A of FIG. 12, when the fingertip of the user moves, for example, in moving the object being the operation target, the output control device 100 renders, as the small-delay pointer representation, a pointer in a manner that the pointer expands from the object being the target of the pointing operation toward the finger of the user while gradually narrowing and increasing in transparency. Further, as illustrated in B of FIG. 12, when the fingertip of the user pauses (for example, in selection operation), the output control device 100 renders, as the stabilized filter representation, the pointer in a manner that the pointer, which has once expanded, contracts and converges on the object. Further, also under the expanded state illustrated in A of FIG. 12, the pointer as the stabilized filter representation is displayed on the object being the operation target.

Figure 13:
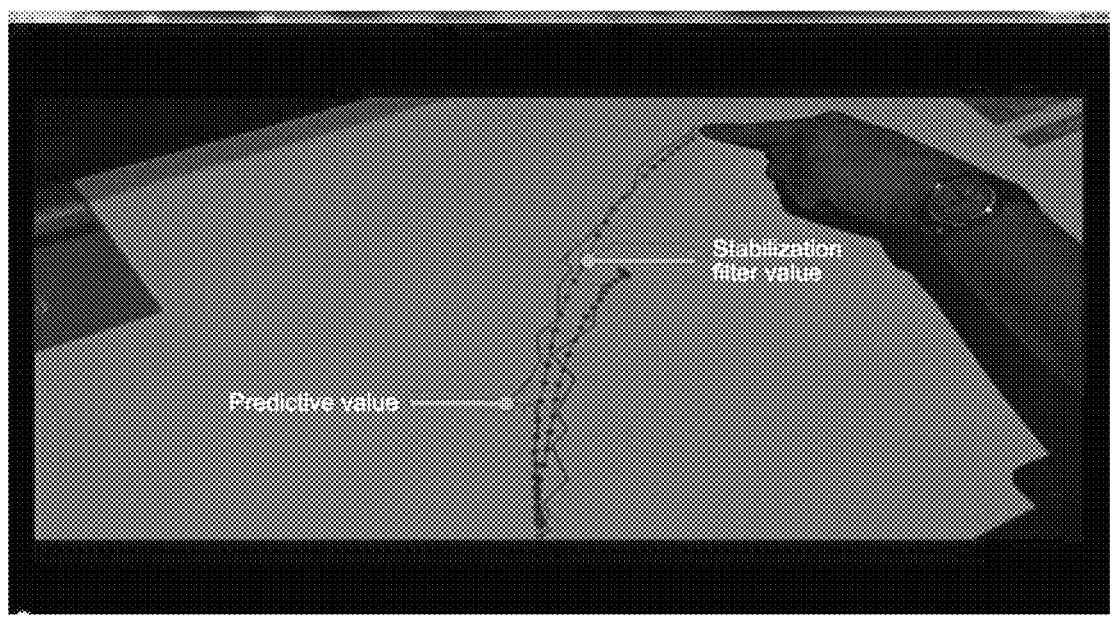
FIG. 13 An explanatory photograph showing different coordinate values used in the yet other modification of the examples of the pointer displayed by the output control device.

Note that, as shown in FIG. 13 and as described above, although the predictive value is small in delay but fluctuates in coordinate value, the stabilization filter value is large in delay but stable in position coordinate. In view of such circumstances, the output control device 100 executes a process of causing the rubber-like representation as described above to narrow and increase in transparency toward its leading end (predictive value during the movement).

Since the leading end is transmissive, even when the above-described fluctuation occurs, the user is not liable to perceive the fluctuation. In addition, since the leading end is narrow, a feeling that a tip of the cursor is continuous with the finger is presented to the user. With this, a feeling of the delay is reduced.

Further, in addition to the effect that the delay is reduced by the predictive value, by causing the leading end to narrow and to be transmissive, the visual effect that the finger is continuous with the leading end is exerted. With this, the feeling of the delay is further reduced. In addition, in stopping the operation or performing the operation slowly, the representation that rubber converges into the circular cursor is displayed. With this, clear feedback of which position is being pointed is provided to the user.

Now, implementation using the rubber-like representation is described in detail.

Figure 15:
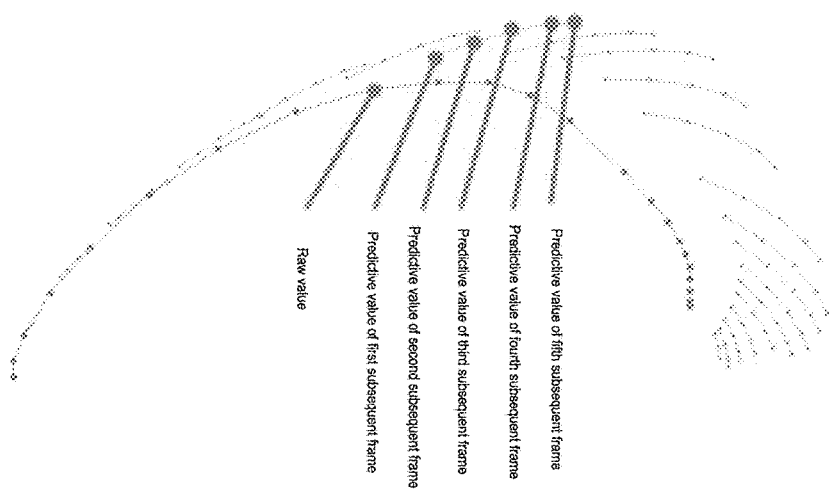
FIG. 15 Another view showing the plurality of predictive values to be used in the yet other modification of the examples of the pointer displayed by the output control device.

The output control device 100 displays the rubber-like representation by an animation using the stabilization filter value and a plurality of predictive values. In this case, as shown in FIG. 15, the plurality of predictive values are predictive values generated by predicting coordinates of first to k-th subsequent frames from a previous path obtained at a timing t. As the number of frames to be predicted increases, the output control device 100 increases the transmittance and narrows the leading end.

Figure 14:
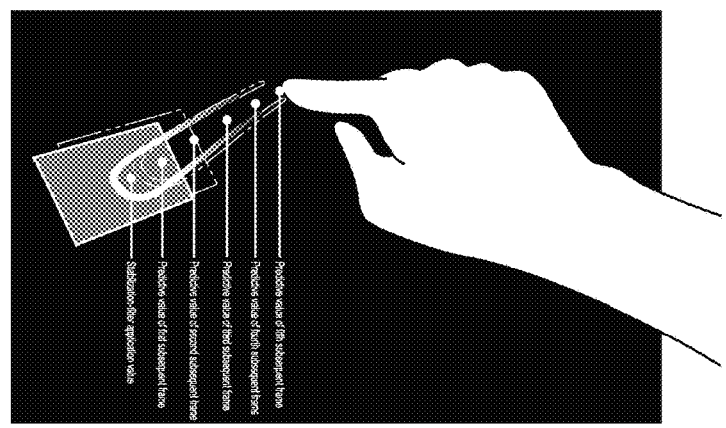
FIG. 14 Views illustrating a plurality of predictive values to be used in the yet other modification of the examples of the pointer displayed by the output control device.
Figure 14:
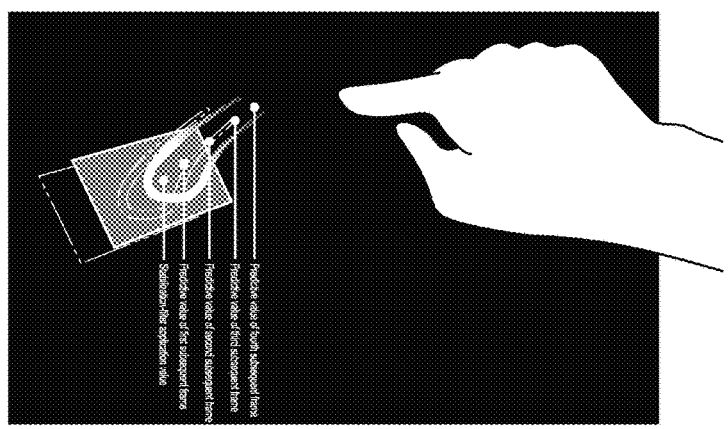

When such a plurality of predictive values are used, not only a representation of straight-expanded rubber at a time when the fingertip of the user moves straight as illustrated in A of FIG. 14, but also a representation of curved rubber at a time when the fingertip of the user makes a circular motion as illustrated in B of FIG. 14 is displayed. Thus, even when the user makes a curvy motion, a feeling that the pointer follows the fingertip of the user can be presented.

Further, the number of the frames to be predicted by the output control device 100 may be fixed, or may be changed as appropriate at each timing. In the above-described embodiment, reliabilities of the predictive values can be obtained. With this, the output control device 100 is enabled to utilize predictive values equal to or more than a threshold for the rubber-like representation, and need not necessarily utilize predictive values equal to or less than the threshold. When only predictive values with relatively high accuracy are used, a representation that has small fluctuation and provides the feeling of being followed is displayed.

However, when the predictive values to be utilized at each timing vary from each other, the leading end of the rubber rapidly expands or contracts. Further, there is influence of the fluctuations of the predictive values themselves. In order to prevent these phenomena, the output control device 100 does not simply use the predictive values as points that render the rubber-like representation (hereinafter, referred to as control points), but interpolates predictive values obtained at each timing in a time direction, and renders a rubber-like cursor with use of these interpolated values.

Figure 16:
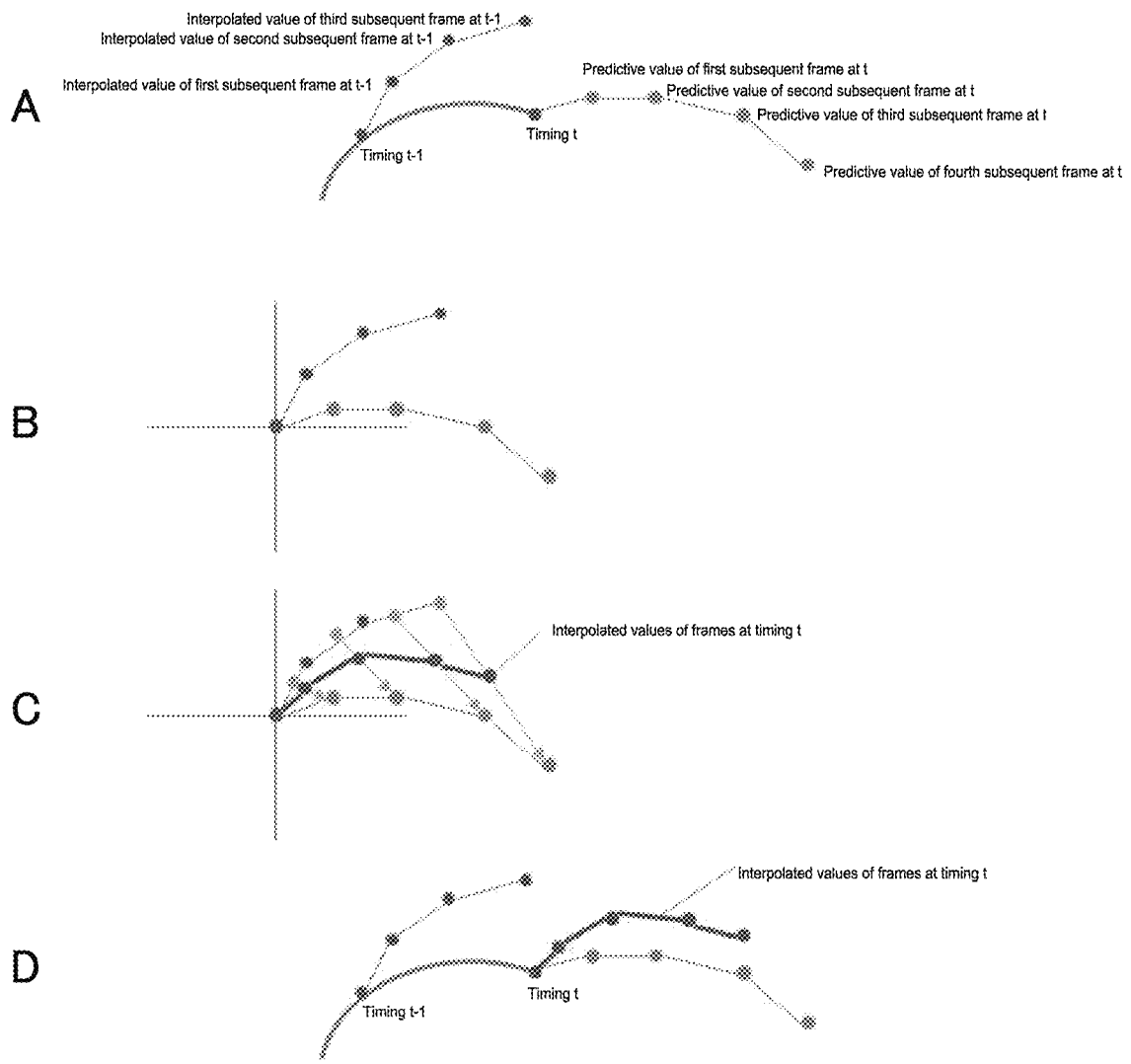
FIG. 16 Explanatory graphs showing interpolation processes on the predictive values used in FIG. 14 and FIG. 15.

FIG. 16 shows details of this interpolation method. A of FIG. 16 shows a group of interpolated values at a timing t−1, and a group of predictive values at a timing t. When predictive values of subsequent frames at the timing t−1 and the timing t are simply interpolated, a delay may occur. As a countermeasure, as shown in B of FIG. 16, the output control device 100 converts the predictive values to those in a coordinate system having an origin corresponding to raw values obtained at the timings t and t−1. As shown in C of FIG. 16, the output control device 100 calculates interpolated values at a subsequent timing from the predictive values and interpolated values at a first preceding timing in this coordinate system. Lastly, as shown in D of FIG. 16, the output control device 100 converts the calculated interpolated values back to positions relative to the raw value at the timing t, and utilizes these converted values as the control points for the rubber-like representation. By such processes, the output control device is enabled to interpolate the animation of the rubber-like cursor without being influenced by the delay corresponding to a distance between the raw values at the timings and with use of only the relative values from the raw values at each timing.

The interpolated values in this case are represented as $P'_{t,k}$ and $P'_{t-1,k}$, and the predictive values in this case are represented as $P_{t,k}$. As shown in B of FIG. 16, the predictive values are represented as values relative to the raw values set as the origin. "$t$" represents the timing, and "k," which ranges from 0 to 1, represents prediction rates. By way of an example of the timing t, these rates 0 to 1 represent coordinates of the raw value to coordinates of a fourth subsequent frame. For example, the coordinates of the subsequent frames are represented as follows.

| | |
|---|---|
| $P_{t,k} = 1$ | Coordinates of fourth subsequent frame |
| $P_{t,k} = 0.75$ | Coordinates of third subsequent frame |
| $P_{t,k} = 0.5$ | Coordinates of second subsequent frame |
| $P_{t,k} = 0.25$ | Coordinates of first subsequent frame |
| $P_{t,k} = 0$ | Raw value |

When a value of k=0.8 is needed, the output control device 100 calculates this value by performing linear interpolation between the coordinates of the third subsequent frame and the coordinates of the fourth subsequent frame. The interpolated values in the cases where the prediction rate k is changed at the timing t is expressed by the following equation.

$$P'_{t,k} = \alpha P_{t,k} + (1-\alpha) P'_{t-1,k}$$

In this equation, $\alpha$ is an interpolation parameter. When $\alpha$ is 1, the output control device 100 uses only information items at the timing t. As $\alpha$ becomes closer to 0, an effect of the interpolation is increased. By using the above-described prediction rates k, the output control device 100 is enabled to calculate interpolated coordinate values without being influenced by a difference in number of frames between the timings t and t−1. The interpolated values calculated in this way are values relative to the origin. Thus, when the output control device 100 lastly adds the coordinates of the raw value at the timing t, the output control device 100 is enabled to obtain the interpolated values for the predictive values without being influenced by a difference between the distance between the raw values at the timings t and t−1 as shown in D of FIG. 16.

When such interpolated values are introduced, the rubber-like animation can be displayed. In other words, by the effect of the parameter of α, representations that the pointer expands like rubber when starting to move, and contracts like rubber when being stopped are displayed.

Although the predictive values and the raw values are used in the above-described calculation or the interpolated values, the interpolated values may be calculated from the predictive values and the stabilization-filter application value. Further, methods other than the linear interpolation may be used as the interpolation technique. In addition, although the above-described calculation of the interpolated values is performed with use of the predictive values represented by the frames, similar processes may be executed with use of predictive values represented by time (t[ms]).

In order to display the small-delay pointer representation and the stabilized pointer representation together, there may be used representation techniques other than the above-described rubber-like representation.

Figure 17:
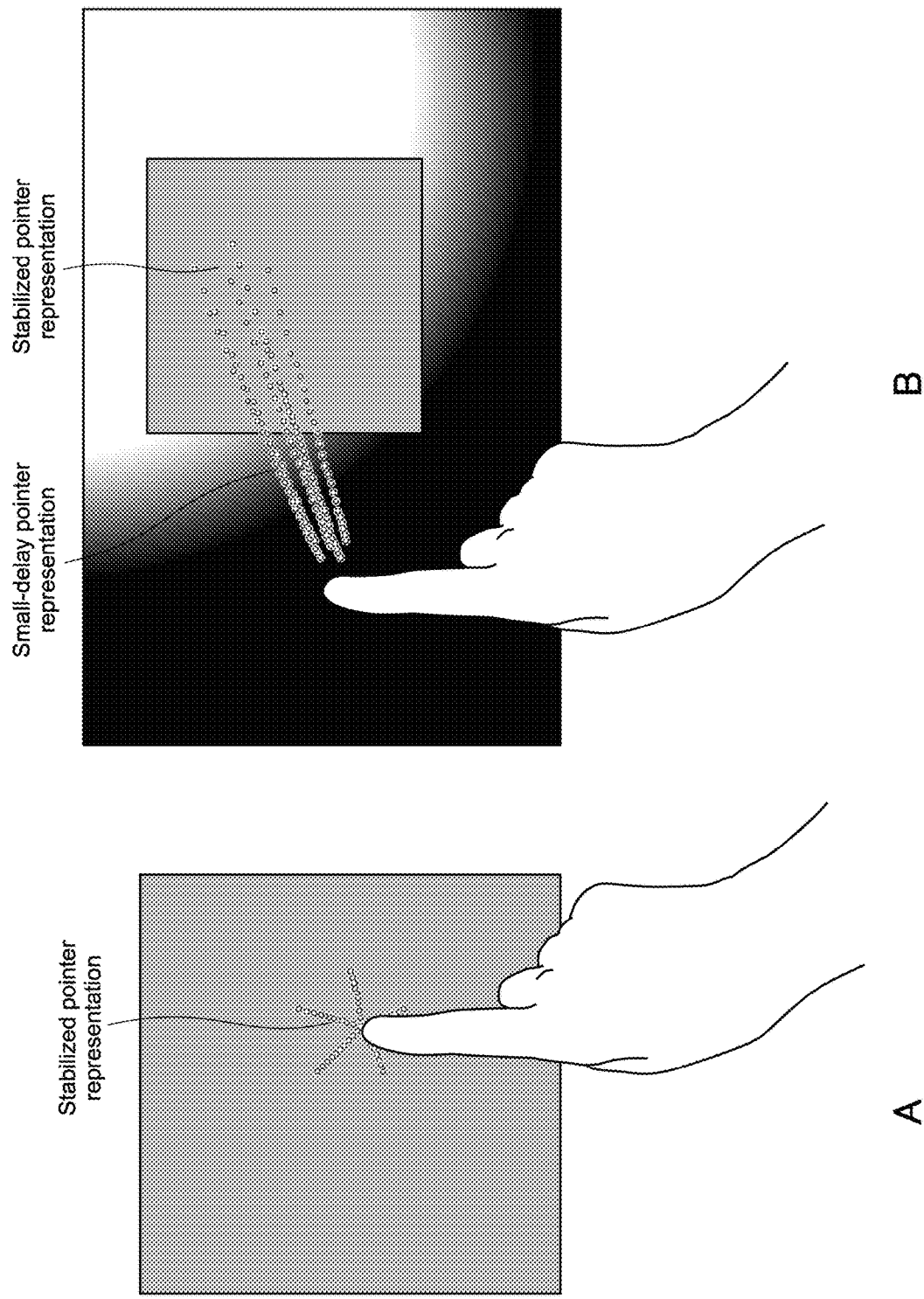
FIG. 17 Views showing yet another modification of the examples of the pointer displayed by the output control device.

For example, as illustrated in FIG. 17, there may be used a representation using a plurality of cords (hereinafter, referred to as net). As illustrated in A of FIG. 17, when the fingertip of the user moves slowly or stops, a representation that leading ends of the net intersect with each other is used. With this, a position of the pointer is clearly represented to the user. As illustrated in B of FIG. 17, when the fingertip of the user moves, there may be used a representation that the net cords extend convergently toward the fingertip. By using the representation that the net cords converge toward the leading ends along with the movement of the fingertip, with the leading ends remaining separated from each other, as by the above-described rubber-like representation, the feeling of the continuity to the fingertip is presented, and the feeling of the delay is reduced. With regard to control points in the net-like representation, similar to those in the rubber-like representation, the plurality of interpolated values are used such that a smooth animation is displayed.

Further, unlike the rubber-like representation, in the net-like representation, when the user simply moves his/her finger in a plane without dragging an object, the user may have a feeling of discomfort from the net-like representation itself. In other words, although the net is capable of presenting a feeling of pinching and pulling a target, when a dragging target does not exist, the net-like representation itself causes the feeling of discomfort.

Figure 18:
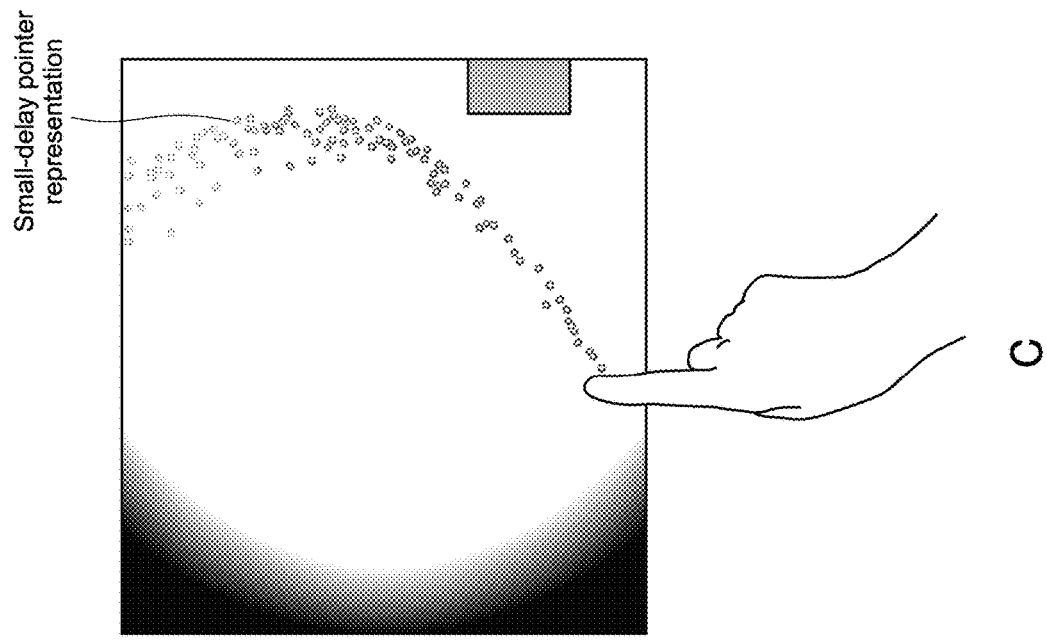
FIG. 18 Views showing yet another modification of the examples of the pointer displayed by the output control device.
Figure 18:
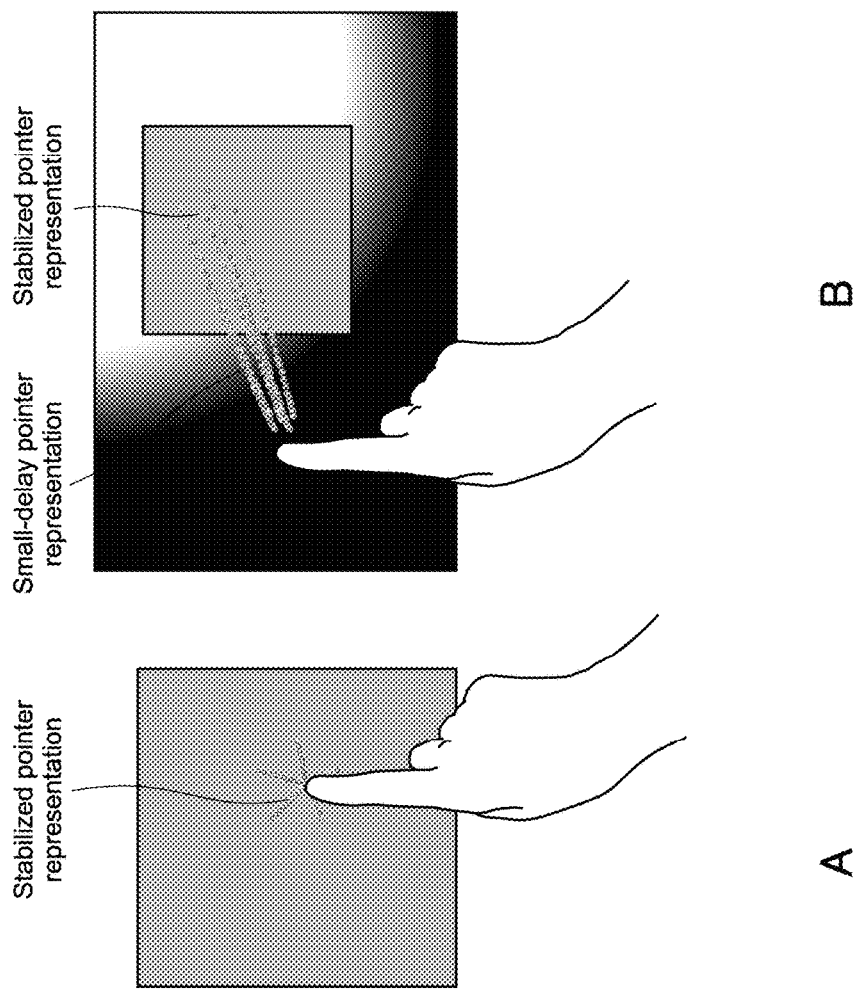

As a countermeasure, as illustrated in FIG. 18, the output control device 100 may switch the representations depending on whether or not the dragging target exists. As illustrated in A and B of FIG. 18, when the dragging target exists, the net-like representation may be used. As illustrated in C of FIG. 18, when the dragging target does not exist, the particle representation may be used, for example.

(Modifications of Conditions for Changing Pointer Representations)

In the above-described embodiment, the output control device 100 controls the representation techniques by using the speed as the operating condition of the pointing operation by the user. However, the representation techniques may be controlled in accordance with other operating conditions such as the distance difference between the stabilized pointer and the small-delay pointer (delay-derived distance difference), control in accordance with an acceleration of the pointing operation, and control in accordance with time (such as application of the small-delay pointer representation only in a few seconds after starting to move).

Further, the operating condition of the pointing operation includes any of a user information item about the user, a device information item about, for example, the output control device 100, the camera 200, or the projector 300, an environment information item about an environment where these devices are installed, and a content information item about a target of the pointing operation by the user.

By way of an example of a case where control is changed in accordance with contents, when icons to be operated aggregate, the pointer operation needs to be carefully performed. Thus, the small-delay pointer representation (that is, a pointer that moves in response to slight movement) may be constantly displayed. Conversely, when the operation target is a large icon, the output control device 100 may cancel the above-described small-delay pointer representation when the operation is performed slowly or stopped.

Further, in the above-described embodiment, control of, for example, causing the representation to be transmissive or cancelling the representation is performed. However, control by other methods may be performed. For example, the output control device 100 may employ methods of, for example, downsizing the pointer, coloring the pointer in the same color as a background color, and changing an appearance of the pointer to another unnoticeable one.

Still further, when an information item about a condition of a CPU or a battery of the output control device 100, the camera 200, or the projector 300 is used as the device information item, the output control device 100 may selectively use the small-delay pointer representation and the stabilized filter representation in accordance with whether or not the CPU or the battery is in a certain condition (for example, a case where a processing load is high, or a case where a remaining capacity of the battery is low).

Yet Further, the small-delay pointer representation and the stabilized filter representation may be selectively used in accordance with the environment information item, specifically, in accordance, for example, with where to install the system including the output control device 100 (indoors or outdoors), or with an illuminance thereat.

Note that, the present technology may also provide the following configurations.

(1)

An information processing device, including
an output control unit that outputs a display information item about an operation object on a basis of a result of detection of a pointing operation with respect to the operation object by a user,
the output control unit outputting the display information item about the operation object such that the operation object is displayed in at least either one of a first display mode and a second display mode different from the first display mode in accordance with an operating condition of the pointing operation.

(2)

The information processing device according to Item (1), in which
the output control unit uses, as the first display mode, a display mode that gives a priority to delay reduction with respect to the pointing operation, and uses, as the second display mode, a display mode that gives a priority to stability of the result of the detection.

(3)

The information processing device according to Item (1) or (2), in which the output control unit switches the display information item about the operation object between the first display mode and the second display mode in accordance with the operating condition of the pointing operation.

(4)

The information processing device according to Item (1) or (2), in which the output control unit makes, in accordance with the operating condition of the pointing operation, a switch between a process of outputting the display information item about the operation object in both the first display mode and the second display mode, and a process of outputting the display information item about the operation object in either one of the first display mode and the second display mode.

(5)

The information processing device according to any of Items (1) to (4), in which the operating condition of the pointing operation includes any of a user information item about the user, a device information item about the information processing device, an environment information item about an environment where the information processing device is installed, and a content information item about a target of the pointing operation.

(6)

The information processing device according to Item (5), in which the result of the detection includes an information item about input coordinate values of the pointing operation, and the operation object is displayed at a position corresponding to the input coordinate values.

(7)

The information processing device according to Item (6), in which the output control unit renders, as the first display mode, the display information item about the operation object on a basis of predictive values calculated from the detected input coordinate values, and renders, as the second display mode, the display information item about the operation object on a basis of coordinate values generated by applying a predetermined stabilization filter to the detected input coordinate values.

(8)

The information processing device according to Item (7), in which the output control unit renders, as the first display mode, the display information item about the operation object by using the predictive values and values arranged at random around the predictive values at the same time, and renders, as the second display mode, the display information item about the operation object while emphasizing the coordinate values generated by applying the stabilization filter.

(9)

The information processing device according to Item (7), in which the user information item includes a speed information item about a speed of the pointing operation, and the output control unit uses the first display mode in a case where a value indicating the speed of the pointing operation included in the speed information item is equal to or larger than a predetermined threshold, and uses the second display mode in a case where the value indicating the speed is less than the predetermined threshold.

(10)

The information processing device according to Item (7), in which the output control unit uses the first display mode in a case where the target of the pointing operation is a first object, and uses the second display mode in a case where the target of the pointing operation is a second object different from the first object.

(11)

The information processing device according to item (7), in which the user information item includes an operation-type information item about a type of the pointing operation, and the output control unit uses the first display mode in a case where the pointing operation is an operation of moving an object, and uses the second display mode in a case where the pointing operation is not the operation of moving an object.

(12)

The information processing device according to Item (7), in which the device information item includes an information item about a condition of a CPU or battery of the information processing device, and the output control unit uses the first display mode in a case where the CPU or battery is in a first condition, and uses the second display mode in a case where the CPU or battery is in a second condition different from the first condition.

(13)

The information processing device according to Item (7), in which the output control unit calculates interpolated values for predictive values at a first time on a basis of the predictive values at the first time and interpolated values for predictive values at a second time preceding the first time, and renders the display information item about the operation object at the first time on a basis of the calculated interpolated values.

(14)

The information processing device according to item (8), in which the output control means renders, as the first display mode, the display information item about the operation object in a form of particles or dots, and renders, as the second display mode, the display information item about the operation object in a form of a cursor or focus.

(15)

The information processing device according to Item (8), in which the pointing operation is an operation with a finger of the user, and the output control means renders, as the first display mode, the display information item about the operation object in a manner that the display information item about the operation object extends from the object as the target of the pointing operation toward the finger of the user while gradually narrowing and increasing in transparency, and renders, as the second display mode, the display information item about the operation object in a manner that the extended form contracts and converges on the object as the target of the pointing operation.

REFERENCE SIGNS LIST

11 CPU
10 storage unit
110 fingertip-position-detection control unit
120 pointer-representation control unit
100 output control device
200 camera 300 projector
T table
A projection region

The invention claimed is:

1. An information processing device, comprising
an output control unit that outputs a display information item about an operation object on a basis of a result of detection of a pointing operation with respect to the operation object by a user,
wherein the output control unit outputs the display information item about the operation object such that the operation object is displayed in at least either one of a first display mode and a second display mode different from the first display mode in accordance with an operating condition of the pointing operation,
wherein the output control unit renders, as the second display mode and on a basis of coordinate values generated by applying a predetermined stabilization filter to the detected input coordinate values, the display information item about the operation object at a position preceding a position of the detected pointing operation, and
wherein the output control unit is implemented via at least one processor.

2. The information processing device according to claim 1, wherein
the output control unit uses, as the first display mode, a display mode that gives a priority to delay reduction with respect to the pointing operation, and uses, as the second display mode, a display mode that gives a priority to stability of the result of the detection.

3. The information processing device according to claim 1, wherein
the output control unit switches the display information item about the operation object between the first display mode and the second display mode in accordance with the operating condition of the pointing operation.

4. The information processing device according to claim 1, wherein
the output control unit makes, in accordance with the operating condition of the pointing operation, a switch between a process of outputting the display information item about the operation object in both the first display mode and the second display mode, and a process of outputting the display information item about the operation object in either one of the first display mode and the second display mode.

5. The information processing device according to claim 1, wherein
the operating condition of the pointing operation includes any of a user information item about the user, a device information item about the information processing device, an environment information item about an environment where the information processing device is installed, and a content information item about a target of the pointing operation.

6. The information processing device according to claim 5, wherein
the result of the detection includes an information item about input coordinate values of the pointing operation, and
the operation object is displayed at a position corresponding to the input coordinate values.

7. The information processing device according to claim 6, wherein
the output control unit renders, as the first display mode, the display information item about the operation object on a basis of predictive values calculated from the detected input coordinate values.

8. The information processing device according to claim 7, wherein
the output control unit renders, as the first display mode, the display information item about the operation object by using the predictive values and values arranged at random around the predictive values at a same time, and renders, as the second display mode, the display information item about the operation object while emphasizing the coordinate values generated by applying the stabilization filter.

9. The information processing device according to claim 8, wherein
the output control unit renders, as the first display mode, the display information item about the operation object in a form of particles or dots, and renders, as the second display mode, the display information item about the operation object in a form of a cursor or focus.

10. The information processing device according to claim 8, wherein
the pointing operation is an operation with a finger of the user, and
the output control unit renders, as the first display mode, the display information item about the operation object in a manner that the display information item about the operation object extends from an object as the target of the pointing operation toward the finger of the user while gradually narrowing and increasing in transparency, and renders, as the second display mode, the display information item about the operation object in a manner that the extended form contracts and converges on the object as the target of the pointing operation.

11. The information processing device according to claim 7, wherein
the user information item includes a speed information item about a speed of the pointing operation, and
the output control unit uses the first display mode in a case where a value indicating the speed of the pointing operation included in the speed information item is equal to or larger than a predetermined threshold, and uses the second display mode in a case where the value indicating the speed is less than the predetermined threshold.

12. The information processing device according to claim 7, wherein
the output control unit uses the first display mode in a case where the target of the pointing operation is a first object, and uses the second display mode in a case where the target of the pointing operation is a second object different from the first object.

13. The information processing device according to claim 7, wherein
the user information item includes an operation-type information item about a type of the pointing operation, and
the output control unit uses the first display mode in a case where the pointing operation is an operation of moving an object, and uses the second display mode in a case where the pointing operation is not the operation of moving an object.

14. The information processing device according to claim 7, wherein
the device information item includes an information item about a condition of a CPU or battery of the information processing device, and the output control unit uses the first display mode in a case where the CPU or battery is in a first condition, and uses the second display mode in a case where the CPU or battery is in a second condition different from the first condition.

15. The information processing device according to claim 7, wherein
the output control unit calculates interpolated values for predictive values at a first time on a basis of the predictive values at the first time and interpolated values for predictive values at a second time preceding the first time, and renders the display information item about the operation object at the first time on a basis of the calculated interpolated values.

16. The information processing device according to claim 1, wherein the output control unit renders, as the first display mode, the display information item about the operation object at a position subsequent to the position of the detected pointing operation.

17. The information processing device according to claim 16, wherein a delay between the position preceding the position of the detected pointing operation and the position of the detected pointing operation is a first value, and a delay between the position subsequent to the position of the detected pointing operation and the position of the detected pointing operation is a second value smaller than the first value.

18. An information processing method, comprising:
acquiring a result of detection of a pointing operation with respect to an operation object by a user; and
outputting, on a basis of the result of the detection, a display information item about the operation object such that the operation object is displayed in at least either one of a first display mode and a second display mode different from the first display mode in accordance with an operating condition of the pointing operation,
wherein the display information item about the operation object is rendered, as the second display mode and on a basis of coordinate values generated by applying a predetermined stabilization filter to the detected input coordinate values, at a position preceding a position of the detected pointing operation.

19. A non-transitory computer-readable medium having embodied thereon a program, which when executed by a computer causes the computer to execute an information processing method, the method comprising:
acquiring a result of detection of a pointing operation with respect to an operation object by a user; and
outputting, on a basis of the result of the detection, a display information item about the operation object such that the operation object is displayed in at least either one of a first display mode and a second display mode different from the first display mode in accordance with an operating condition of the pointing operation,
wherein the display information item about the operation object is rendered, as the second display mode and on a basis of coordinate values generated by applying a predetermined stabilization filter to the detected input coordinate values, at a position preceding a position of the detected pointing operation.

* * * * *